May 15, 1928.  
R. LA FRANCE  
1,669,475

GLASS DELIVERY APPARATUS

Filed Aug. 21, 1926  2 Sheets-Sheet 1

INVENTOR  
Richard La France  
BY  *J. F. Rule*  
ATTORNEY

Patented May 15, 1928.

1,669,475

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-DELIVERY APPARATUS.

Application filed August 21, 1926. Serial No. 130,570.

This invention relates to improvements in glass delivery apparatus and particularly to means for delivering glass to a revolving tank from which charges are gathered by suction into the blank molds of a forming machine.

Where revolving tanks are employed in delivering molten glass to forming machines, the tank is continuously rotated, and molds on a continuously rotating mold carriage move over a portion of the tank, from which portion charges are gathered by the blank molds which are successively lowered into charge gathering engagement with the glass in the tank. Charges are gathered from what is termed a "gathering area", said area being spaced slightly inward from the rim of the tank. After the charges are gathered, the glass is cut at the mouth of the mold, allowing chilled portions of glass to drop upon the surface between this gathering area and rim of the tank, with the result that blisters and bubbles are created upon this portion of the glass surface. Ordinarily, the fresh hot glass is delivered to the tank through a relatively short spout or trough which delivers the glass just inside the rim of the tank. This glass which is poured into the tank being hotter than the body of glass within the tank, tends to cause the chilled glass adjacent the rim of the tank to move inward so that it is brought within the gathering range of the blank molds. The inwardly moving glass thus comprises a mixture of hot and comparatively cold glass and also portions of glass which have been chilled by contact with the dipping blank molds, and sometimes, also, glass which has been charged with blisters or air bubbles caused by the chilled droppings from the blank molds trapping air as they drop on the surface of the glass in the tank. These chilled portions move into the gathering area and quite naturally are gathered into the molds with the charges, resulting in the formation of defective ware.

An object of the present invention is to provide means for delivering the fresh hot glass to a point spaced inwardly from a gathering area, and cause an outward surface movement of the glass by which the molds are supplied at the gathering area with glass at even temperature and in the best working condition. This outward surface movement of the glass also causes the chilled and blistered portions to be precipitated outwardly from the gathering area so that they are reheated and reassimilated by the hotter portions of glass as they work their way back to a zone of even temperature before rising and ultimately being drawn into the blank molds, with the result that the glass in the gathering area is at all times maintained in the best possible working condition.

Another feature of the present invention is the provision of a relatively long spout or trough, by means of which glass may be delivered to substantially the center of a revolving tank, and thereby create such circulation of glass in the tank that stagnation is entirely eliminated, said trough being so supported that it is not materially affected by the intense heat in the casing which encloses the trough.

Other objects of the invention will be apparent hereinafter.

Figure 1:
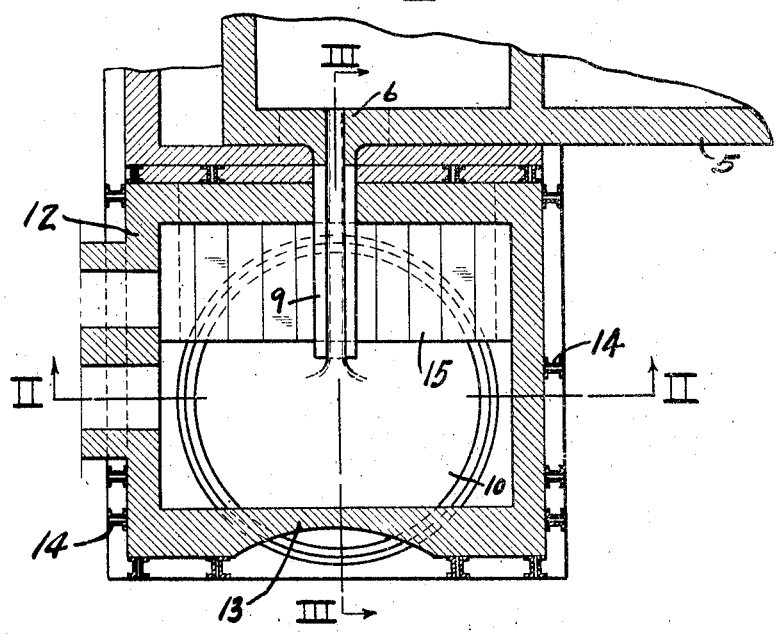
Figure 1 is a part sectional plan view illustrating the application of my invention to a glass furnace and revolving tank.
Figure 2:
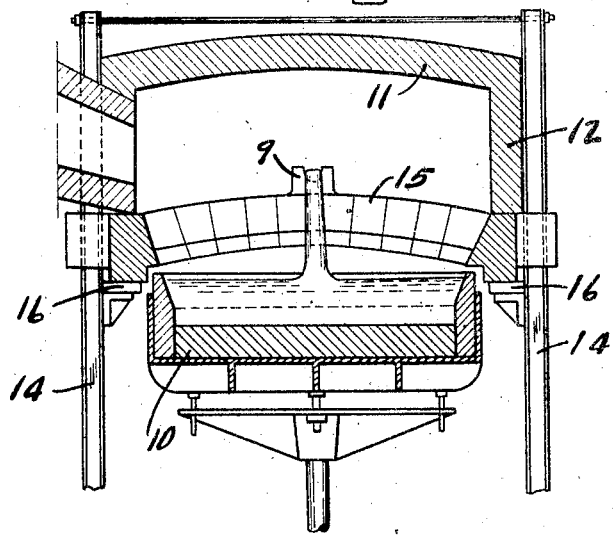
Figure 2 is a sectional elevation taken substantially on line II—II of Figure 1.
Figure 3:
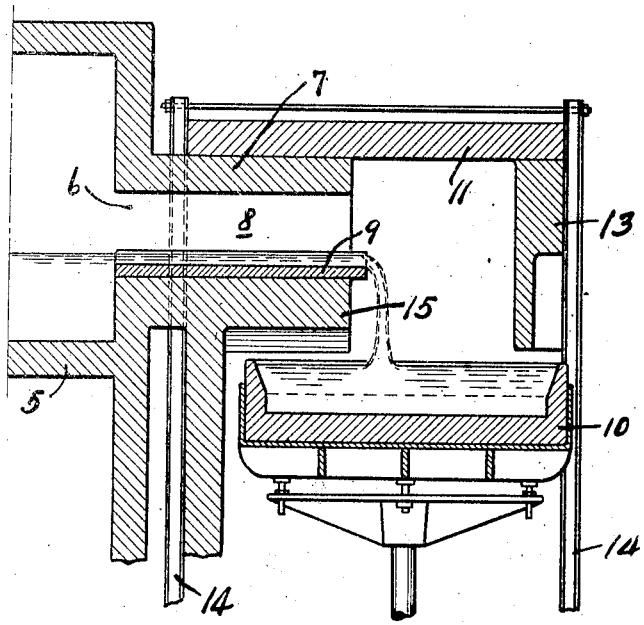
Figure 3 is a sectional elevation taken substantially on the line III—III of Figure 1, illustrating delivery of fresh glass to substantially the center of a revolving tank.

Referring to the accompanying drawings, the furnace 5 is provided with a discharge outlet 6 in one of its side walls, said outlet opening into a longitudinal passageway 8. A replaceable trough 9 is arranged in this longitudinal passageway 8, and has its inner end portion resting upon the bottom wall of the latter.

A revolving tank 10 is so located that the outer or discharge end of the trough 9 terminates at a point spaced inwardly from the gathering area, preferably near the center of the tank. This tank is intended to be rotated in the usual manner.

A casing is provided for a portion of the revolving tank 10 and a major portion of the lateral extension 7, and includes a ceiling or roof 11 provided with depending sides 12 terminating at points adjacent the revolving tank, as is customary. Suitable frame members 14 are employed in mounting a casing in proper relation to the furnace and tank. The front wall 13, or jack arch, is partially cut away to expose a gathering area of the glass in the revolving tank so that the blank molds of a forming machine may successively gather charges of glass, as in the usual practice.

For the purpose of effectively supporting the discharge end portion of the trough so that the intense heat in the casing will not cause destruction thereof, an arch 15 is built to span the revolving tank, the center of the arch being arranged in supporting engagement with substantially the outer half of the trough. The opposite ends of the arch 15 are supported upon opposed brackets 16, which, in turn, are fixed to certain of the frame members 14.

Figure 4:
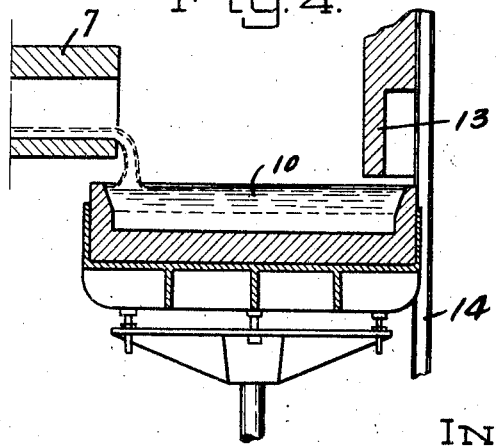
Figure 4 is a sectional view illustrating the ordinary method of delivering fresh glass to a revolving tank, the delivery trough terminating at a point to discharge the fresh hot glass substantially in the gathering area.

Figure 4 illustrates the usual method of delivering molten glass to a revolving tank, such method calling for the use of a relatively short spout or trough whose discharge end terminates substantially over the gathering area into which blank molds successively dip to gather their charges. This delivery of fresh glass causes an inward surface movement which brings chilled and blistered portions from the space between the rim of the tank and the gathering area back into the latter, with the result that the gathered charges include greater or less quantities of chilled glass which cause production of defective ware.

By delivering the fresh hot glass to substantially the center of the body of glass in the revolving tank, or inwardly from the gathering area, an outward surface movement is created, resulting in forcing of the chilled and blistered portions below the surface. This forced precipitation of the chilled portions, insures their complete reheating and reassimilation by the inner and hotter glass. During the reheating of these chilled portions, they move inwardly a considerable distance before rising to the surface, thereby assuring heating of glass to the best possible condition prior to return to the gathering area.

Manifestly, certain changes in the minor details of construction may be resorted to as may fall within the spirit and scope of the invention as claimed.

What I claim is:

1. Glass delivery apparatus comprising a revolving tank, and means for feeding molten material to substantially the center of the tank.

2. Glass delivery apparatus comprising a glass supply furnace, a revolving tank, and means for feeding glass from the furnace to substantially the center of the tank.

3. Glass delivery apparatus comprising a glass supply furnace, a revolving tank, and a trough extending from the furnace and terminating adjacent the center of said tank.

4. Glass delivery apparatus comprising a glass supply furnace, a revolving tank, a trough extending from the furnace and terminating adjacent the center of said tank, and auxiliary means for supporting the discharge end of the trough.

5. Glass delivery apparatus comprising a glass supply furnace, a revolving tank, a trough extending from the furnace and terminating adjacent the center of said tank, and a transverse arch spanning the tank and supporting the outer portion of the trough.

6. Glass delivery apparatus comprising a source of glass supply, a revolving tank, a casing for said tank, a trough extending into the casing from the source of supply and terminating adjacent the center of the tank, and a transverse support in said casing supporting the outer portion of said trough.

7. Glass delivery apparatus comprising a source of glass supply, a revolving tank, a casing for said tank, a trough extending into the casing from the source of supply and terminating adjacent the center of the tank, a transverse arch arranged within the casing to support the outer portion of the trough, and a common means supporting the casing and arch.

8. Glass delivery apparatus comprising a furnace having an outlet, a revolving tank, a trough extending from the outlet to deliver glass to substantially the center of the tank, a casing for the trough and tank, and auxiliary means supporting the outer portion of the trough.

Signed at Toledo, in the county of Lucas and State of Ohio, this 18th day of August, 1926.

RICHARD LA FRANCE.